United States Patent [19]

Parkinson et al.

[11] 4,312,153
[45] Jan. 26, 1982

[54] DOOR SEAL

[75] Inventors: William R. Parkinson, Canyon Country; Thomas R. Swift, Sun Valley; Paul F. Ivanick, Los Alamitos, all of Calif.

[73] Assignee: Lockheed Corporation, Burbank, Calif.

[21] Appl. No.: 103,761

[22] Filed: Dec. 14, 1979

[51] Int. Cl.³ .............................................. E06B 7/16
[52] U.S. Cl. ...................................... 49/485; 49/40; 244/129.5
[58] Field of Search ................. 49/475, 479, 482, 483, 49/470, 489, 488, 485, 392, 40, 496; 244/121, 129.5

[56] References Cited

U.S. PATENT DOCUMENTS

| 623,364 | 4/1899 | Golden | 49/392 |
|---|---|---|---|
| 2,443,751 | 6/1948 | Terepin et al. | 49/485 X |
| 3,596,980 | 8/1971 | Cadiou | 49/485 |

Primary Examiner—Kenneth Downey
Attorney, Agent, or Firm—Frederic P. Smith

[57] ABSTRACT

A door seal for use on an aircraft in which one portion of a striker (22) is attached to the door (12) and a second portion of the striker (34) is attached to the door frame (14) and in which one portion of a lip (18) for engaging the striker is attached to the door (12) and a second portion of the lip (16) is attached to the door frame (14), the two lip portions (16, 18) being configured to overlap one another and to mate with the two striker portions (22, 34) and with one another when the door (12) is closed, whereby the lip (18) on the door (12) transitions to a lip (16) on the door frame (14).

9 Claims, 16 Drawing Figures

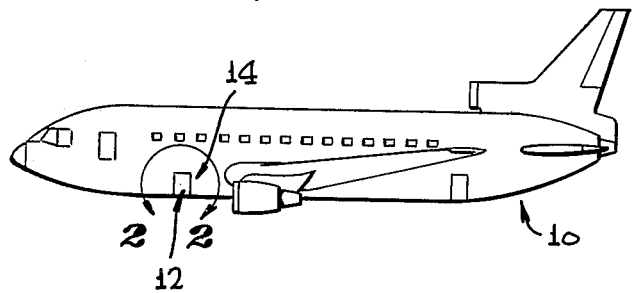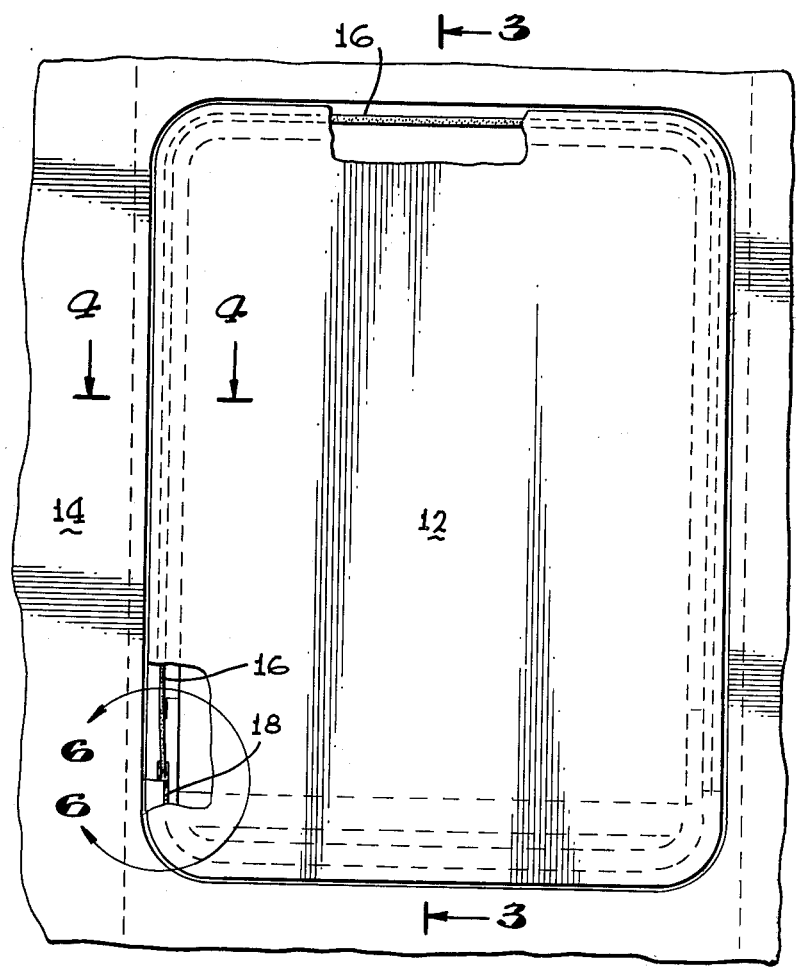

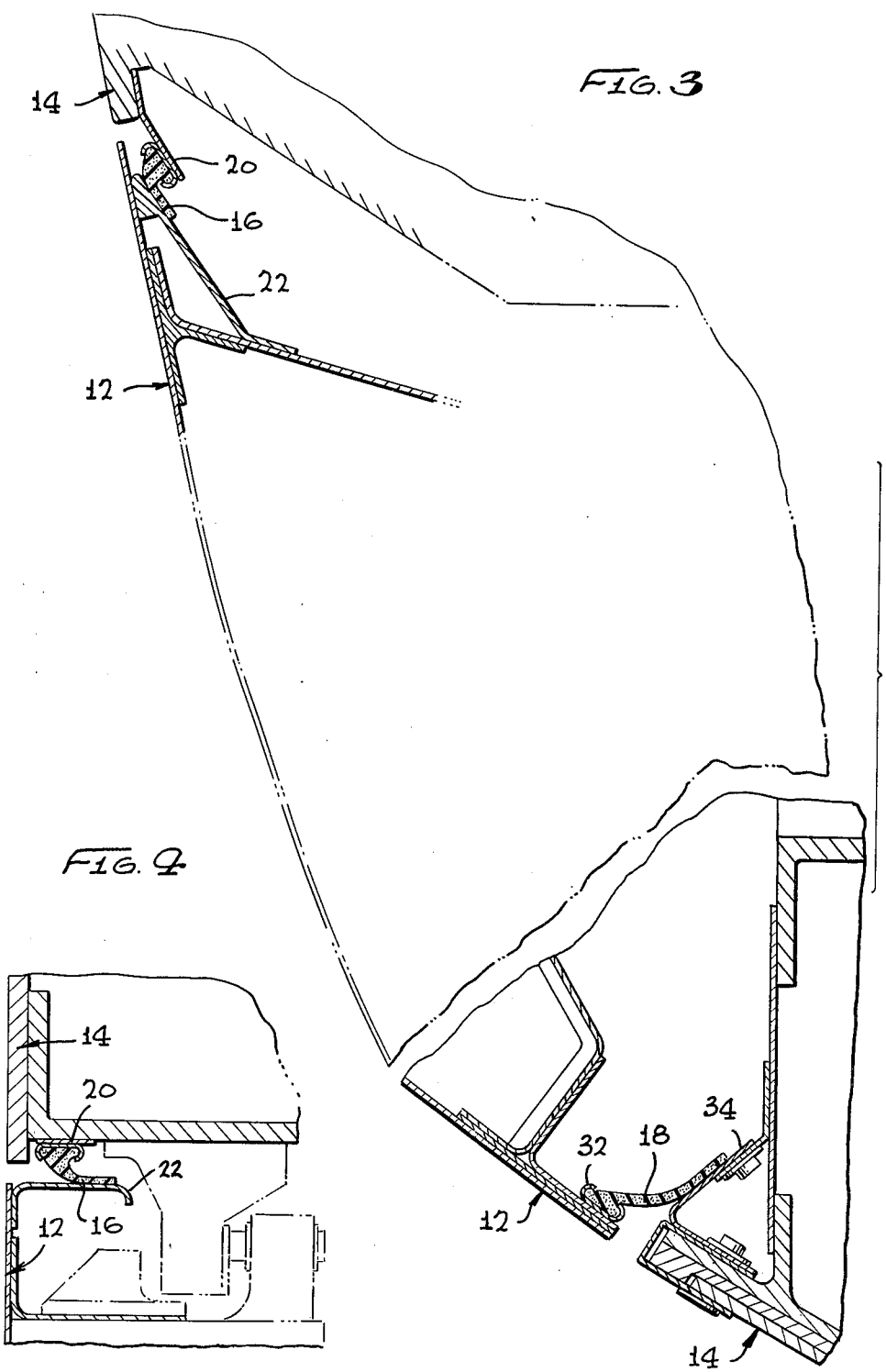

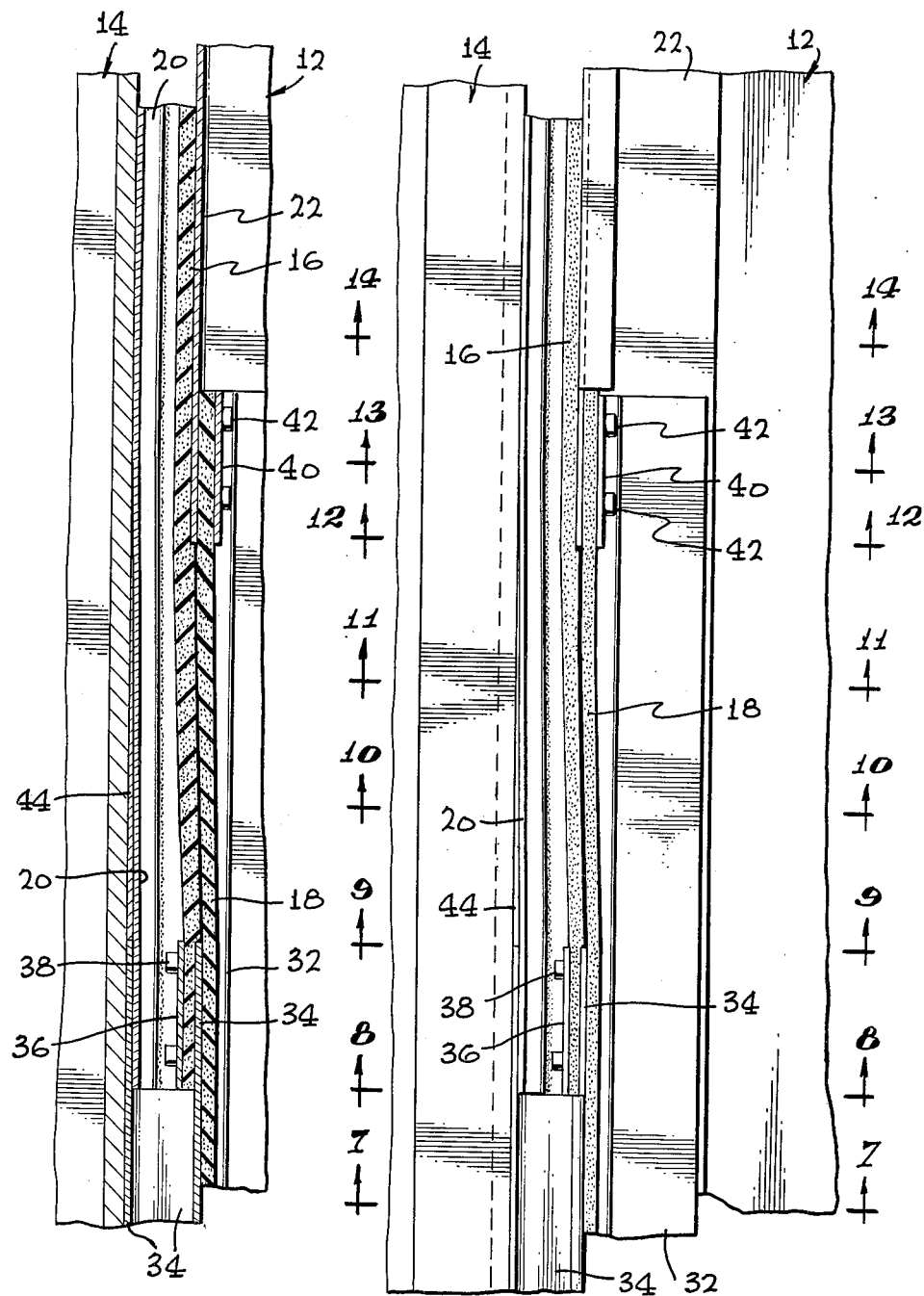

DOOR SEAL

TECHNICAL FIELD

The invention related to the field of door seals and, in particular, to door seals for use on aircraft.

BACKGROUND ART

The operation of aircraft at high altitude makes it desirable that certain areas of the aircraft, such as the cabin, cockpit on cargo areas, be pressurized to a higher pressure corresponding to a lower altitude. While seals have been designed that are satisfactory in certain areas of the aircraft, such as the cockpit and passenger compartment, as shown in U.S. Pat. Nos. 2,433,751, 2,797,884 and 3,085,297, no door seals have yet proved satisfactory for the cargo compartment of an aircraft. This is due to the dual requirement that the seal in the upper sill area of the door not be prone to damage by the lifting mechanism and upper pressure hooks for the door and that the seal in the lower sill area of the fuselage surround not collect debris. Thus, for example, with the flexible lip entirely on the fuselage surround structure, or door frame, and the striker on the door, the lower sill collects debris. On the other hand, with the flexible lip entirely on the door and the striker on the door frame, the upper sill area is very prone to damage from the lifting mechanism and the upper pressure hooks.

Accordingly, it is a general object of the present invention to provide an improved door seal.

It is another object of the present invention to provide an improved seal for the cargo compartment of an aircraft.

It is a further object of the present invention to provide an improved seal for the cargo compartment of an aircraft which is not prone to damage by the door mechanisms and which does not collect unwanted debris.

DISCLOSURE OF INVENTION

A door seal for use on an aircraft is provided. The seal comprises a striker and a flexible lip for engaging the striker with one portion of the striker being attached to the door and a second portion of the striker being attached to the door frame. One portion of the lip is attached to the door and a second portion of the lip is attached to the door frame. The two lip portions are configured to overlap one another and to mate with the two striker portions and with one another when the door is closed. In a preferred embodiment the portion of the lip on the door is across the bottom of the door to prevent accumulation of debris and the portion of the lip on the door frame, or fuselage surround structure, is across the top of the door frame to accommodate the clearance of the upper books and lifting areas. The two lip portions overlap and mate with one another at the lower region of the two sides of the door and the door frame where the portion of the lip on the door transitions to the portion of the lip on the door frame.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF DRAWINGS

FIG. 1 is a perspective view of an airplane illustrating a cargo door location;

FIG. 2 is a plan, partially cut-away view of the cargo door of FIG. 1 and a portion of the fuselage surround;

FIG. 3 is a cross-sectional view of the door and fuselage surround of FIG. 2 taken along the line 3—3 of FIG. 2;

FIG. 4 is a cross-sectional view of the door and fuselage surround of FIG. 2 taken along the line 4—4 of FIG. 2;

FIG. 6 is a detailed view of the region 6—6 of FIG. 2 illustrating an embodiment of the present invention;

FIG. 15 is a cross-sectional view of the region 6—6 of FIG. 2 taken along line 15—15 of FIG. 11.

BEST MODE OF CARRYING OUT THE INVENTION

Figure 5:
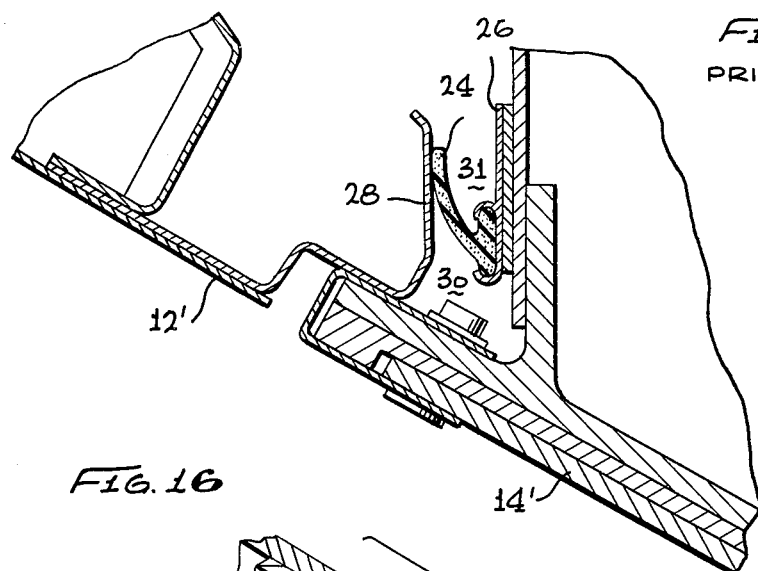
FIG. 5 is a cross-sectional view of a door and fuselage surround used in the prior art.

Referring now to FIGS. 1 and 2, an airplane 10 is shown having a cargo door 12. The area surrounding the cargo door 12, commonly referred to as the fuselage surround structure or the door frame, is indicated by the numeral 14. Attached to the door frame 14 is a flexible lip 16, consisting of, for example, a fabric wrapped silicone rubber, which extends around the door frame 14 from the top portion thereof down to the lower portion thereof defined by the region 6—6 of FIG. 2. Attached to the door 12 is a flexible lip 18 which extends along the bottom thereof and up into the region 6—6 of FIG. 2, where it overlaps the lip 16 of the frame 14. As will be illustrated in further detail hereafter, a striker is carried by the door 12 to substantially engage the lip 16 and a striker is also carried by door frame 14 to substantially engage the lip 18. In region 6—6 of FIG. 2 there is a transition region where the lip 16 on the door frame 14 changes into a striker to engage the lip 18, and the lip 18 on the door 12 changes into a striker to engage the lip 16, and where the lips 16 and 18 overlap and engage only one another.

Referring now to FIG. 3, the lip 16 is shown attached to the fuselage surround or door frame 14 by a bracket 20. A striker 22 is shown coupled to the door 12 and is in intimate contact with the lip 16 when the door is in the closed position. As can be seen, the lip 16 is carried entirely by the door frame 14 in the upper portion of the door frame 14 while the striker 22 which mates with the lip 16 is carried entirely by the door 12 in the upper portion of the door 12.

Referring now to FIG. 4, which is a cross-sectional view of the door 12 and the door frame 14 part way down the sides thereof, it is seen that the lip 16 is still coupled to the door frame 14 by the bracket 20 and that the striker 22 is still coupled to the door 12, although the configurations of both the bracket 20 and the striker 22 have changed considerably to accommodate the particular mating requirements of that portion of the door-door frame structure.

Referring now to FIGS. 3 and 5, in FIG. 5 a prior art seal arrangement is illustrated in which the door is indicated by the numeral 12' and the door frame is indicated by the numeral 14'. As is shown in FIG. 5, a lip 24 is coupled to the door frame 14' by a bracket 26, while a striker 28 is coupled to the door 12'. While the lip 24 and the striker 28 form an intimate seal, it is easily seen that the regions 30 and 31 permit the collection of debris and ice in those areas which can eventually result in the interference of the mating between the lip 24 and the striker 28. This problem of debris and ice collection has been avoided in the present invention by the seal arrangement shown in the lower portion of FIG. 3, in which the lip 18 is coupled to the door 12 by bracket 32 while the striker 34 is coupled to the door frame 14. As is evident, there is no area for the collection of debris and ice as there was in FIG. 5 due to the transposition of the lips 18 and 24 and the strikers 34 and 28.

Figure 7:
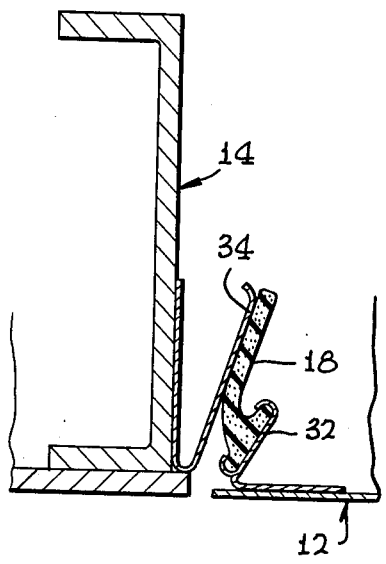
FIGS. 7-14 are cross-sectional views of the embodiment of the present invention illustrated in FIG. 6 taken along the lines 7—7 through 14—14 of FIG. 6.
Figure 12:
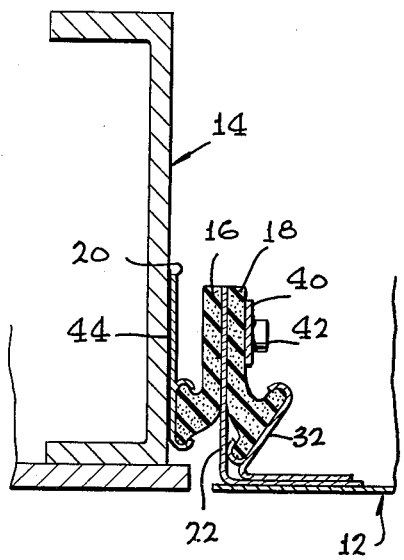
Figure 13:
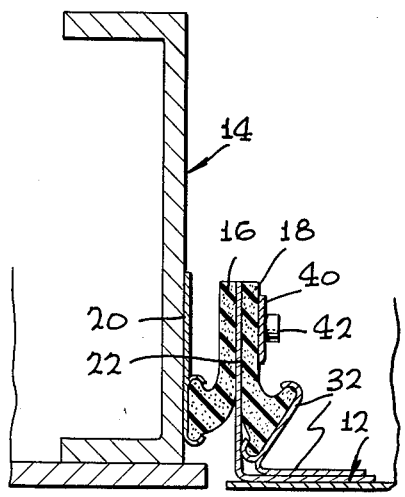
Figure 14:
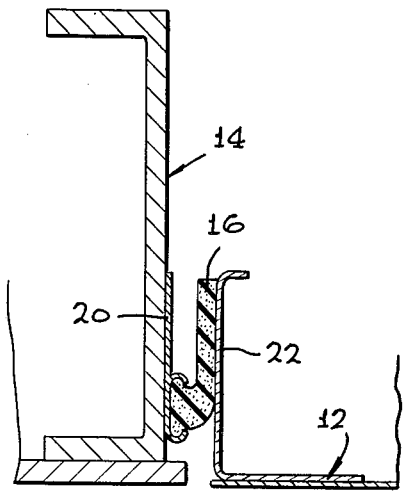

The changing of lip 16 into striker 34 and striker 22 into lip 18 is illustrated in FIGS. 6–16, with FIGS. 7–14 being cross-sectional views taken along lines 7—7 through 14—14 of FIG. 6. As can be seen, the structure illustrated in FIG. 7 is substantially identical to the structure illustrated in the lower portion of FIG. 3 with the lip 18 being coupled to the door 12 by the bracket 32 and the striker 34 being coupled to the door frame 14. As can also be seen, the structure illustrated in FIG. 14, is substantially identical to that illustrated in FIG. 4 with the lip 16 being coupled to the door frame 14 by the bracket 20 and the striker 22 being coupled to the door 12. Thus in the transition region between FIGS. 7 and 14, the lip 18 has changed into the striker 22 and the striker 34 has changed into the lip 16, as also illustrated in the top portion of FIG. 3.

Figure 16:
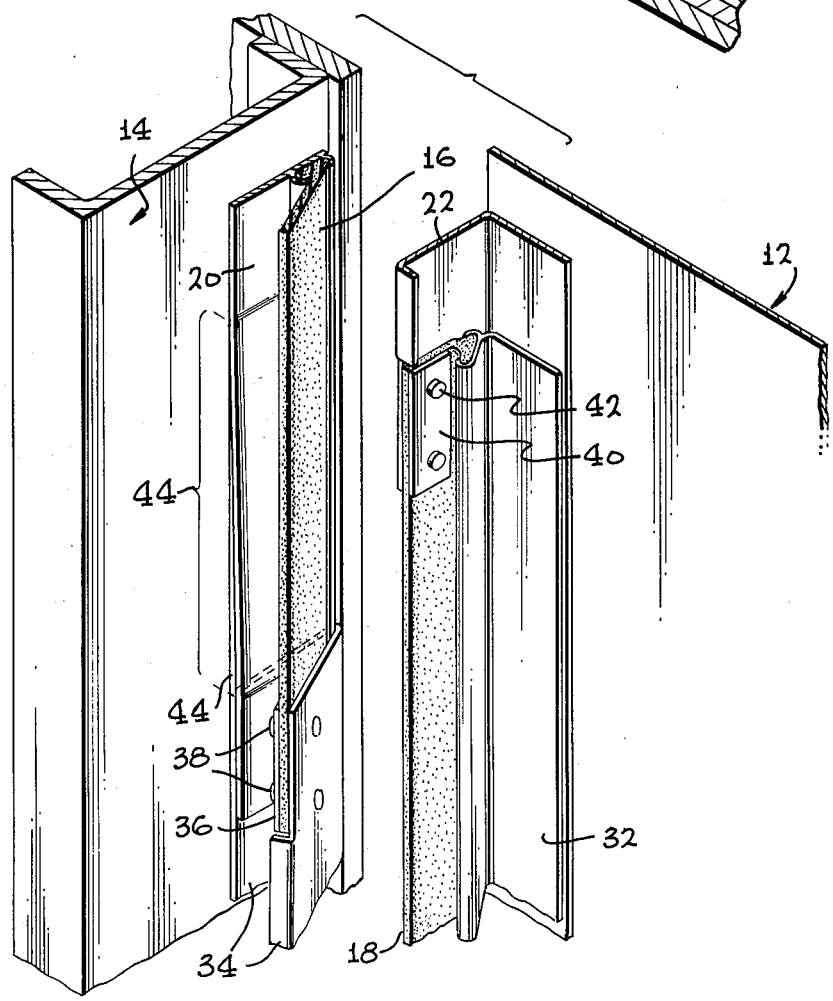
FIG. 16 is an isometric view of an embodiment of the present invention in the region 6—6 of FIG. 2.
Figure 8:
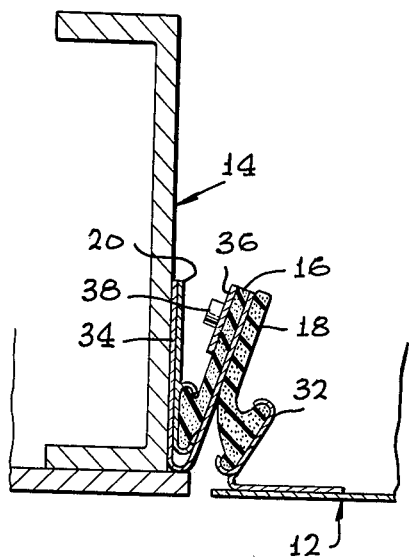
Figure 9:
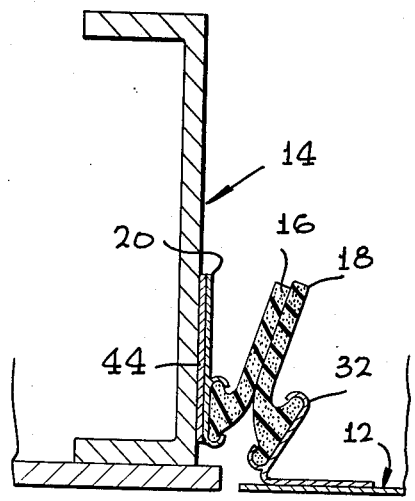
Figure 10:
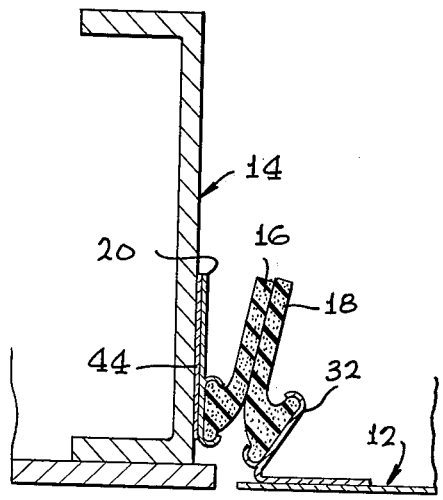
Figure 11:
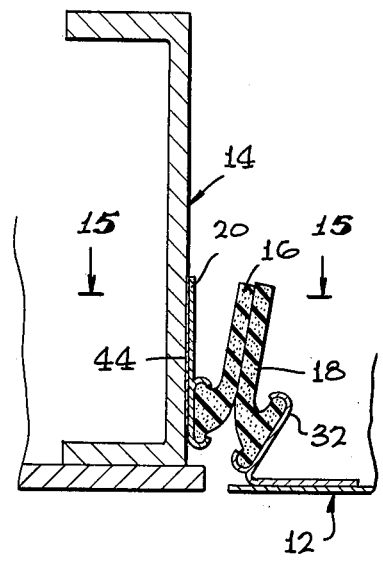

Looking now at FIGS. 8–13 in conjunction with FIGS. 6, 15 and 16, it can be seen in FIG. 8 that lip 16 has begun and has become attached to striker 34 by means of a splice plate 36 and bolts 38, with the lip 16 being coupled to the door frame 14 by means of bracket 20 and striker 34. In FIG. 9, it is seen that the splice plate 36 and the striker 34 have ended and that the portion of the transition region where there is merely a lip to lip interface has begun with the lip 16 being an intimate contact with the lip 18 and each being supported by their respective brackets 20 and 32 to a wedge 44 and the door frame 14 and the door 12. The wedge 44 shown therein is provided to fill the void between bracket 20 and the door frame 14 where the bracket 20 is joggled over striker 34. FIGS. 10 and 11 illustrate substantially the same structure as in FIG. 9 but show the wedge 44 decreasing in thickness as the seal progresses through the transition region. In FIG. 12, the upper edge of the transition region is shown with striker 22 beginning and with lip 18 now being secured between striker 22 and striker plate 40 by bolts 42. FIG. 13 illustrates substantially the same structure as FIG. 12, but with the bracket 20 now being directly coupled to the door frame 14 and the wedge 44 having ended. As illustrated in FIGS. 12 and 13, the lip 16 is now in contact with the striker 22. With the disappearance of the lip 18 in FIG. 14, the transition from striker 34 to lip 16 and lip 18 to striker 22 has now been completed.

Having thus described the invention, it is obvious that numerous modification and departures may be made by those skilled in the art. The strikers may, for example, be made integral with the door or frame or may be eliminated entirely if the door is adapted to overlap and be secured to the outer portion of the frame rather than fitting within the frame. In such a case, the lips would merely alternate being attached to the door to the frame and would overlap in the transition regions. Depending on the configuration to be mated, there may be any number of transition regions and the transition regions maybe located at any point on the door-door frame interface, or on any type of interface that could employ such a seal, depending upon the particular need. Thus, for example, only a single transition region may be needed if the door slides into the door frame and only contacts the frame at the bottom and top portions and one edge portion. Thus, the invention is to be construed as being limited only by the spirit and scope of the appended claims.

INDUSTRIAL APPLICABILITY

The door seal is useful as a cargo pressure door seal on an aircraft.

We claim:

1. Apparatus for sealing a door and the frame of said door around the peripheries thereof comprising: first striker means coupled to the upper portion
    of the periphery of said door; second striker means coupled to the lower portion
    of the periphery of the frame of said door;
    first lip means attached to the lower portion of the periphery of said door and adapted to mate with said second striker means when said door is closed and to have portions thereof extending beyond said second striker means;
    second lip means attached to the upper portion of the periphery of the frame of said door and adapted to mate with said first striker means when said door is closed and to have portions thereof extending beyond said first striker means;
    the extended portions of said first and second lip means being configured to mate with one another in an overlapping manner when said door and said frame are engaged in portions of said door and said frame of said door between said upper and lower peripheries thereof to completely seal said door and said frame and said first striker means and said first lip means are alternately opposed to said second striker means and said second lip means.

2. The apparatus of claim 1 further comprising means for coupling said first striker means and said first lip means.

3. The apparatus of claim 1 further comprising means for coupling said second striker means and said second lip means.

4. A seal for engageable structures comprising:
    first striker means adapted to be coupled to first structure;
    first lip means adapted to be coupled to a second structure in an opposed relationship to said first striker means and adapted to mate with said first striker means and to have one or more portions thereof extending beyond said first striker means when said structures are engaged;
    second striker means adapted to be coupled to said second structure adjacent an extended portion of said first lip means; and
    second lip means adapted to be coupled to said first structure adjacent said first striker means in opposed relationship to said second striker means and adapted to mate with said second striker means and to have one or more portions thereof extending beyond said second striker means when said structures are engaged;

whereby the extended portions of said first and second lip means mate with one another in an overlapping manner when said structures are engaged and the striker and lip on the first structure are alternately opposed to the striker and lip on the second structure.

5. The seal of claim 4 wherein said first structure comprises a door and said second structure comprises a door frame.

6. The seal of claim 5 wherein said seal extends around the periphery of said door and said door frame.

7. The seal of claim 6 wherein said first striker means extends around the upper periphery of said door and is adjacent said second lip means extending around the lower periphery of said door and said first lip means extends around the upper periphery of said door frame and is adjacent said second striker means extending around the lower periphery of said door frame, whereby said first striker means mates with said lip means on the upper periphery of said door and said door frame, said second striker means mates with said second lip means on the lower periphery of said door and said door frame and said extended portions of said first and second lip means mate with one another at portions of said door and door frame between said upper and lower peripheries thereof.

8. The seal of claim 4 wherein said striker means comprises a portion of said first and second structures.

9. The seal of claim 4 further comprising means for coupling said first striker means to said second lip means and for coupling said second striker means to said first lip means.

* * * * *